US012596129B2

(12) United States Patent
Shawish et al.

(10) Patent No.: US 12,596,129 B2
(45) Date of Patent: Apr. 7, 2026

(54) METHODS, MEDIUMS, AND SYSTEMS FOR MONITORING THE HEALTH OF AN ANALYTICAL CHEMISTRY SYSTEM

(71) Applicant: Waters Technologies Ireland Limited, Dublin (IE)

(72) Inventors: Fadi Shawish, Pawtucket, RI (US); Richard S. Threlfall, Westborough, MA (US); Stephen Payne, Franklin, MA (US)

(73) Assignee: Waters Technologies Ireland Limited, Dublin (IE)

( * ) Notice: Subject to any disclaimer, the term of this patent is extended or adjusted under 35 U.S.C. 154(b) by 630 days.

(21) Appl. No.: 18/066,037

(22) Filed: Dec. 14, 2022

(65) Prior Publication Data

US 2023/0184794 A1 Jun. 15, 2023

Related U.S. Application Data

(60) Provisional application No. 63/289,938, filed on Dec. 15, 2021.

(51) Int. Cl.
G01N 35/00 (2006.01)

(52) U.S. Cl.
CPC ............................ G01N 35/00594 (2013.01)

(58) Field of Classification Search
CPC ....... G01N 35/00594; G01N 35/00584; G01N 35/00; G16H 10/40; G16H 10/00; G16H 40/40; G16H 40/00; G16H 40/67
See application file for complete search history.

(56) References Cited

U.S. PATENT DOCUMENTS

| 2003/0014505 A1* | 1/2003 | Ramberg | ............ G06F 11/2294 |
| | | | 714/E11.173 |
| 2016/0054280 A1* | 2/2016 | Root | .................... G01N 35/025 |
| | | | 436/45 |
| 2017/0206477 A1* | 7/2017 | Almasan | ............ G06Q 10/0633 |

(Continued)

FOREIGN PATENT DOCUMENTS

EP 3226002 A1 10/2017

OTHER PUBLICATIONS

International Search Report and Written Opinion for International Patent Application No. PCT/IB2022/062233, mailed Feb. 24, 2023.

(Continued)

*Primary Examiner* — Mohamed Charioui
(74) *Attorney, Agent, or Firm* — Goodwin Procter LLP

(57) ABSTRACT

Exemplary embodiments provides computer-implemented methods, mediums, and apparatuses configured to monitor the health of analytical chemistry systems. A monitoring system may be highly coupled to laboratory analytical instruments that it monitors. It may receive data and/or trends in the data as that data is generated by the instrument. Consequently, it can be configured to recognize when that data or trend signals a problem that needs to be corrected. A kiosk of the monitoring system may be configured to be in direct communication with the analytical chemistry system and to execute an action from the issue resolution structure to make the adjustment. Because the monitoring system is part of the direct physical control of the instrument(s), it can fix problems very quickly.

20 Claims, 9 Drawing Sheets

(56) References Cited

U.S. PATENT DOCUMENTS

2020/0185091 A1\*   6/2020   Davis ..................... G16H 10/40
2022/0414613 A1\*  12/2022   Cardasis ................. G06N 3/02

OTHER PUBLICATIONS

International Preliminary Report on Patentability for Internation
Patent Application No. PCT/IB2022/062233, mailed Jun. 27, 2024.

\* cited by examiner

700

METHODS, MEDIUMS, AND SYSTEMS FOR MONITORING THE HEALTH OF AN ANALYTICAL CHEMISTRY SYSTEM

CROSS-REFERENCE TO RELATED APPLICATIONS

This application claims priority to and benefit of U.S. Provisional Patent Application No. 63/289,938, filed Dec. 15, 2021. The entire disclosure of which is hereby incorporated by reference.

BACKGROUND

Laboratory analytical instruments are devices for qualitatively and/or quantitatively analyzing samples. They are often used in a laboratory setting for scientific research or testing. Such devices may measure the chemical makeup of a sample, the quantity of components in a sample, and perform similar analyses. Examples include mass spectrometers, chromatographs, titrators, spectrometers, elemental analyzers, particle size analyzers, rheometers, thermal analyzers, etc.

An analytical chemistry system may be made up of one or more laboratory analytical instruments, along with other support devices. Occasionally, maintenance needs to be performed on the system devices, and even properly maintained devices may suffer problems that need to be troubleshooted from time to time. In conventional analytical environments, this maintenance and troubleshooting might be done based on best practices maintained in operating manuals or the general knowledge of an expert user. For instance, a lab manual might require that specified maintenance procedures be performed on a given laboratory analytical instrument at regular intervals.

Conventional techniques could be slow and, in some cases, ineffective. For instance, when a new issue arises in a laboratory analytical instrument, an administrative user might need to call in an expert who understands the instrument's operations in detail and can diagnose and resolve the problem. Until the expert is available to solve the problem, the instrument (which tends to be very expensive) might sit unused.

Furthermore, if the problem has not been encountered before, even an expert user might have difficulty diagnosing and resolving it. Not only does the expert need to perform analyses on the instrument, but the expert needs to make changes to the instrument without necessarily having direct control over the portions of the instruments that are being adjusted. This can make it more difficult and time-consuming to address a problem with an instrument.

BRIEF SUMMARY

Exemplary embodiments relate to improved techniques for monitoring the health of analytical chemistry systems. Exemplary embodiments may include computer-implemented methods, as well as non-transitory computer-readable mediums storing instructions for performing the methods, apparatuses configured to perform the methods, etc.

In one embodiment, a computer-implemented method includes receiving data associated with an analytical chemistry system. For instance, the data may be analysis data obtained by a laboratory analytical instrument during an analysis of a sample. It might also include instrument state data describing one or more parameter values for the instrument, and/or settings for the instrument.

A trigger condition may be identified in the data. The trigger may be associated with a system health issue. For instance, the trigger condition may be indicative of a maintenance problem or the diagnosis of an issue with the instrument, such as when a pattern in the data has been known to signify an imminent failure of an instrument subsystem.

A kiosk in communication with the analytical chemistry system may receive a notification of a system health issue for the analytical chemistry system. The kiosk may be an external device separate from the analytical instruments of the system (such as a separate computer, tablet, mobile device, etc.). The notification may be generated locally at the kiosk based on the kiosk identifying the trigger condition, or the notification may be sent from a different device (such as one of the instruments, or a cloud computing device).

The issue may be looked up in a system health condition database to retrieve an issue resolution structure, where the issue resolution structure includes explanatory text and an adjustment to be made to the analytical chemistry system. The issue resolution structure may be, for example, an entry in a database, dictionary, or other similar structure where the trigger conditions (or the associated system health issue) can serve as a key that can be used to look up an explanation and resolution (in the form of the adjustment). The notification and the explanatory text may be displayed in an interface on the kiosk. Thus, the problem can be flagged for resolution.

One advantage of the techniques described is that the monitoring system is highly coupled to the laboratory analytical instruments it monitors. It receives data and/or trends in the data as the data is generated by the instrument. Consequently, it can be configured to recognize when that data or trend signals a problem that needs to be corrected (often much faster than an administrator or expert would be able to recognize the problem).

Still further, the issue need not be limited to an issue with a particular type of laboratory analytical instrument (e.g., mass spectrometers) or even with laboratory analytical instruments in general. The monitoring system can be configured to work with many different types of instruments and/or support equipment.

According to a second embodiment, the data may be automatically uploaded to a cloud computing service, and the notification may be received from the cloud computing service. This may allow for more complex analyses, in that the cloud system can receive and process more data in a more efficient manner than the kiosk. Thus, more types of problems can be identified (potentially more quickly than at the kiosk).

According to a third embodiment, the kiosk may be configured to be in direct communication with the analytical chemistry system and to execute an action from the issue resolution structure to make the adjustment. Direct communication may refer to a direct communication path between the kiosk and the analytical chemistry system (potentially on a local wired or wireless network) that allows the kiosk to exert direct physical control over the settings of the devices of the system. The kiosk may not require an intermediary or proxy to act on its behalf to change the settings. Because the monitoring system is part of the direct physical control of the instrument(s), it can fix issues very quickly without introducing problematic lag. For example, when the monitoring system receives an instruction to stop the flow of a fluid through an instrument (either in response to a user selection or automatically based on an analysis of trending data coming off the instrument), the flow of fluid can stop nearly instantaneously.

According to a fourth embodiment, the action may be executed in real time in response to a user instruction. Real-time execution refers to executing an action within a predefined, often guaranteed, limited amount of time of the action that triggered it (typically a relatively short time frame). Because of the direct communication link described in connection with the third embodiment, actions taken at the kiosk can be reflected very quickly in the control of the instrument or other device being maintained. This can solve issues more quickly and reliably than when a user has only indirect or non-real-time control over the device. For instance, if an expert attempts to make a change to a system in a conventional setting, the expert may have indirect and/or non-instantaneous control over the device. Thus, it may take some time for the change to filter through the device and become effective. In some cases, the user might make multiple changes (thinking that a previous change has failed to address the problem), where one of the earlier changes fixes the issue on a lag. Thus, it may be difficult to determine which action resolved the problem; moreover, the effect of earlier changes may suppress or enhance later changes, and it may be difficult to isolate the specific changes that resolved the issue.

According to a fifth embodiment, the explanatory text may include first explanatory text that describes a problem and a solution. The solution may be linked to the action from the issue resolution structure. A selection of the first explanatory text may be received, and the action from the issue resolution structure may be automatically performed without further user interaction. This embodiment may reduce or eliminate the need for an expert user to be called in to address the problem, providing a streamlined way to fix the issue. Moreover, because the solution is stored in the issue resolution structure, the system is readily extensible—by adding additional explanatory text and linked actions to the structure, the same system can be taught to respond to new situations. In some cases, the system can be provided with learning capabilities (such as machine learning and/or artificial intelligence) to learn to respond to problems that have been encountered and resolved in the past.

According to a sixth embodiment, identifying the trigger condition may include comparing the data to a maintenance limit, or identifying a trend in the data. A maintenance limit may be a predefined threshold that a data or instrument parameter value should not exceed. Such a limit may be a maximum or a minimum. If a maintenance limit is exceeded, it may indicate that preventative maintenance needs to be performed earlier than anticipated. This may reduce instrument downtime (since the instrument might otherwise break down and require more extensive repairs before the next scheduled maintenance cycle). A trend may indicate a predefined pattern in the data—for instance, if the data increases or decreases at more than a predefined rate, or if different linked data values move together in a certain way. Even if a maintenance limit is not exceeded, the direction and rate of change in the data may indicate that a problem is likely to arise in the future, allowing the issue to be addressed before it cascades into a larger problem.

According to a seventh embodiment, the system health issue may be a diagnostic or maintenance issue. Although the embodiments described herein can be used to perform all manner of actions in response to data trends (e.g., data capture in response to detecting predefined conditions, auditing, identifying relationships between different data elements, etc.), they are particularly well-suited to diagnosing problems and/or performing preventative maintenance. For example, instead of performing maintenance on a set schedule independent of the system context, exemplary embodiments can eliminate unnecessary maintenance cycles and perform needed maintenance in response to the data actually coming off the analytical chemistry system.

Other technical features may be readily apparent to one skilled in the art from the following figures, descriptions, and claims.

Unless otherwise noted, it is contemplated that each embodiment may be used separately to achieve the advantages specifically identified above. It is also contemplated that the embodiments described above (and elsewhere herein) may be used in any combination to achieve further synergistic effects. Other technical features will be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
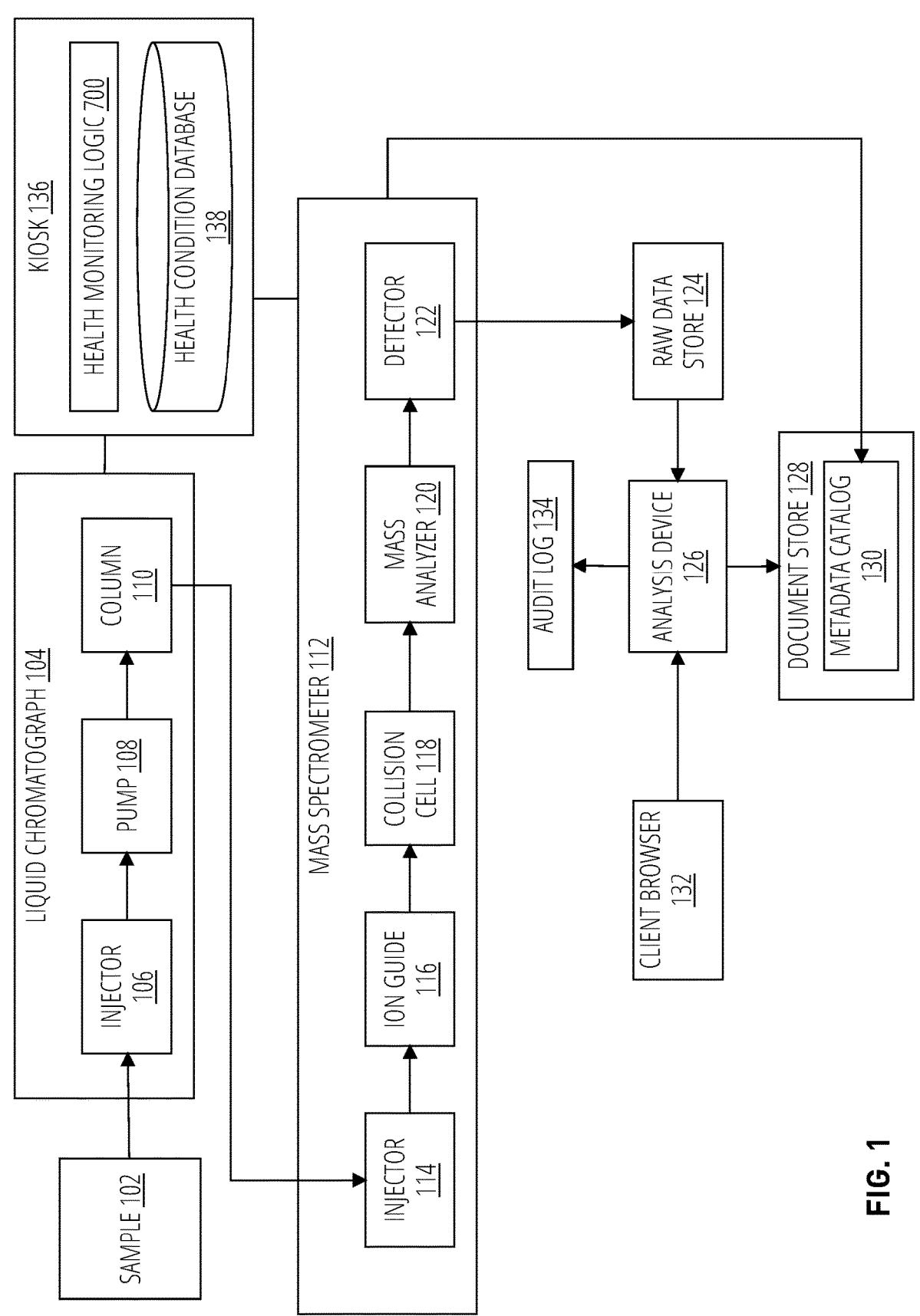
FIG. 1 illustrates an example of an analytical chemistry system according to an exemplary embodiment.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components

122-1, 122-2, 122-3, 122-4, and 122-5. The embodiments are not limited in this context.

These and other features will be described in more detail below with reference to the accompanying figures.

For purposes of illustration, FIG. 1 is a schematic diagram of an analytic laboratory system that may be used in connection with techniques herein. Although FIG. 1 depicts particular types of laboratory analytical instruments in a specific liquid chromatography/mass spectrometry (LCMS) configuration, one of ordinary skill in the art will understand that different types of chromatographic devices (e.g., MS, tandem MS, etc.) may also be used in connection with the present disclosure.

A sample 102 is injected into a liquid chromatograph 104 through an injector 106. A pump 108 pumps the sample through a column 110 to separate the mixture into component parts according to retention time through the column.

The output from the column is input to a mass spectrometer 112 for analysis. Initially, the sample is desolved and ionized by a desolvation/ionization device 114. Desolvation can be any technique for desolvation, including, for example, a heater, a gas, a heater in combination with a gas or other desolvation technique. Ionization can be by any ionization techniques, including, for example, electrospray ionization (ESI), atmospheric pressure chemical ionization (APCI), matrix assisted laser desorption (MALDI) or other ionization technique. Ions resulting from the ionization are fed to a collision cell 118 by a voltage gradient being applied to an ion guide 116. Collision cell 118 can be used to pass the ions (low-energy) or to fragment the ions (high-energy).

Different techniques may be used in which an alternating voltage can be applied across the collision cell 118 to cause fragmentation. Spectra are collected for the precursors at low-energy (no collisions) and fragments at high-energy (results of collisions).

The output of collision cell 118 is input to a mass analyzer 120. Mass analyzer 120 can be any mass analyzer, including quadrupole, time-of-flight (TOF), ion trap, magnetic sector mass analyzers as well as combinations thereof. A detector 122 detects ions emanating from mass analyzer 122. Detector 122 can be integral with mass analyzer 120. For example, in the case of a TOF mass analyzer, detector 122 can be a microchannel plate detector that counts intensity of ions, i.e., counts numbers of ions impinging it.

A raw data store 124 may provide permanent storage for storing the ion counts for analysis. For example, raw data store 124 can be an internal or external computer data storage device such as a disk, flash-based storage, and the like. An analysis device 126 analyzes the stored data. Data can also be analyzed in real time without requiring storage in a storage medium 124. In real time analysis, detector 122 passes data to be analyzed directly to analysis device 126 without first storing it to permanent storage.

Collision cell 118 performs fragmentation of the precursor ions. Fragmentation can be used to determine the primary sequence of a peptide and subsequently lead to the identity of the originating protein. Collision cell 118 includes a gas such as helium, argon, nitrogen, air, or methane. When a charged precursor interacts with gas atoms, the resulting collisions can fragment the precursor by breaking it up into resulting fragment ions. Such fragmentation can be accomplished by switching the voltage in a collision cell between a low voltage state (e.g., low energy, <5 V) and a high voltage state (e.g., high or elevated energy, >15V). High and low voltage may be referred to as high and low energy, since a high or low voltage respectively is used to impart kinetic energy to an ion.

Various protocols can be used to determine when and how to switch the voltage for such an MS/MS acquisition. After data acquisition, the resulting spectra can be extracted from the raw data store 124 and displayed and processed by post-acquisition algorithms in the analysis device 126.

Metadata describing various parameters related to data acquisition may be generated alongside the raw data. This information may include a configuration of the liquid chromatograph 104 or mass spectrometer 112 (or other chromatography apparatus that acquires the data), which may define a data type. An identifier (e.g., a key) for a codec that is configured to decode the data may also be stored as part of the metadata and/or with the raw data. The metadata may be stored in a metadata catalog 130 in a document store 128.

The analysis device 126 may operate according to a workflow, providing visualizations of data to an analyst at each of the workflow steps and allowing the analyst to generate output data by performing processing specific to the workflow step. The workflow may be generated and retrieved via a client browser 132. As the analysis device 126 performs the steps of the workflow, it may read read raw data from a stream of data located in the raw data store 124. As the analysis device 126 performs the steps of the workflow, it may generate processed data that is stored in a metadata catalog 130 in a document store 128; alternatively or in addition, the processed data may be stored in a different location specified by a user of the analysis device 126. It may also generate audit records that may be stored in an audit log 134.

A kiosk 136 may interact with the laboratory analytical instrument(s) in the analytical chemistry system. The kiosk 136 may host health monitoring logic 700 configured to monitor for certain conditions or patterns in the data being received from the laboratory analytical instruments. When certain triggering conditions are met, the kiosk 136 may look up a related issue in a health condition database 138 (see FIG. 2) and retrieve explanatory text to be displayed on a GUI. When a user selects the explanatory text in the GUI, a workflow retrieved from the health condition database 138 may be automatically executed. The workflow may include one or more actions configured to resolve the issue that triggered the notification. At least some of the actions may be automatically executed without further user intervention.

For example, the data being received from the liquid chromatograph 104 may indicate that there is a leak somewhere in the liquid chromatograph 104. The workflow involved in resolving this issue may involve halting the flow through the liquid chromatograph 104, performing diagnostic tests on the system valves, rotors, waste lines, etc.), The kiosk 136 may be directly highly coupled with the laboratory analytical instruments. For instance, the kiosk 136 may be connected to the laboratory analytical instruments through a wired or wireless connection in a local network. In some embodiments, the kiosk 136 may be be capable of directly controlling settings or parameter values for the instruments (such as being capable of directly controlling the power, flow rate, thermal management systems, etc. of the instruments without the use of an intermediary or proxy device). Thus, a user need not move to the device and manually make adjustments (or adjust the device through an associated application)—the user can simply select the issue on the kiosk to effect an immediate (e.g., real-time) response from the instrument.

For simplicity, the kiosk 136 is shown with connections to the liquid chromatograph 104 and the mass spectrometer 112 (the laboratory analytical instruments); however, embodiments are not limited to connections to laboratory analytical instruments. The kiosk 136 may be directly and/or indirectly connected to other devices, such as the analysis device 126, client browser 132, raw data store 124, document store 128, or audit log 134.

Figure 8:
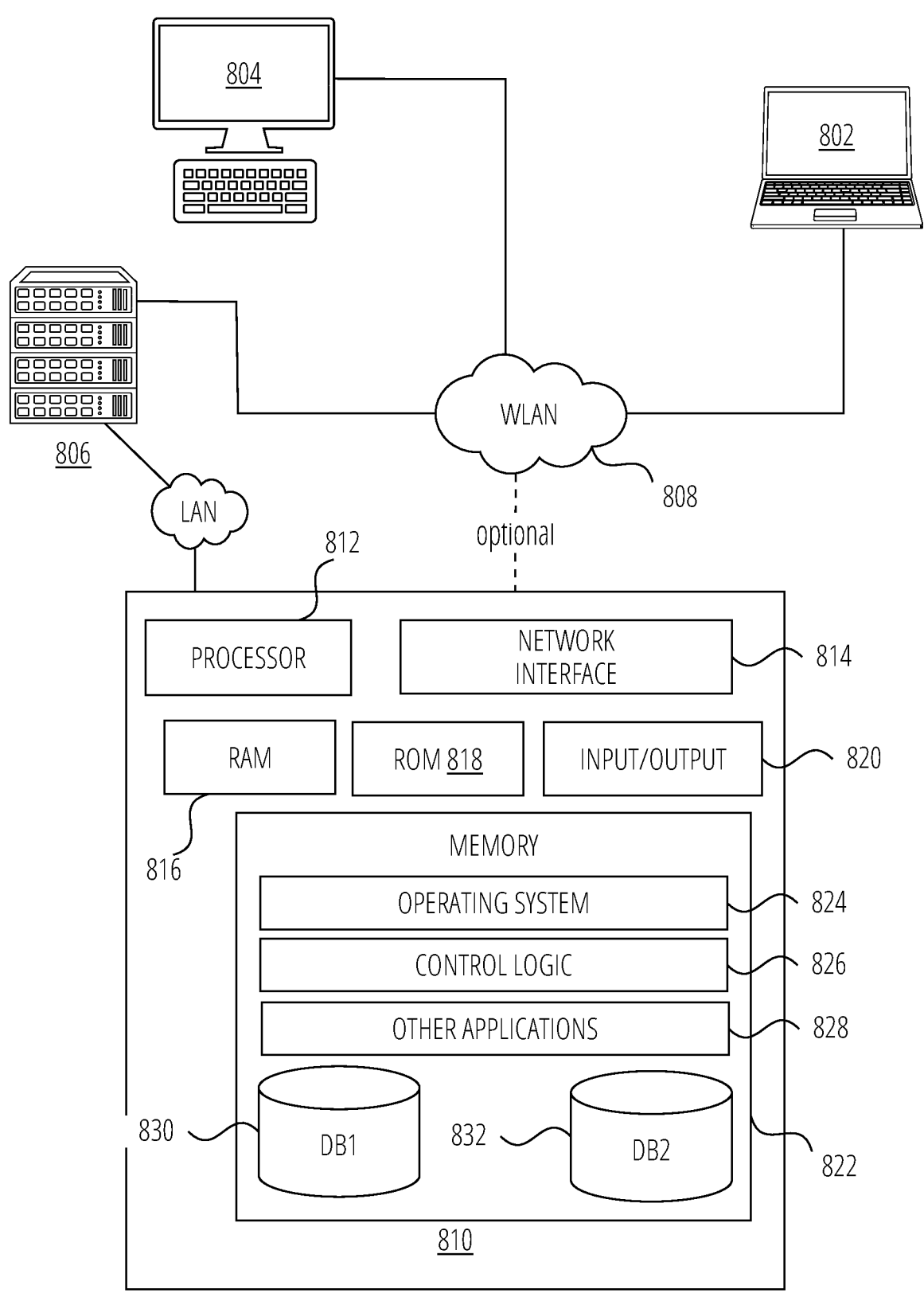
FIG. 8 depicts an illustrative computer system architecture that may be used to practice exemplary embodiments described herein.

The exemplary embodiments described herein may be incorporated into the kiosk 136 (potentially in conjunction with a cloud computing device, as described in more detail below). They may also or alternatively be performed at the client browser 132 and analysis device 126, among other locations. An example of a device suitable for use as a kiosk 136, an analysis device 126, and/or a client browser 132, as well as various data storage devices, is depicted in FIG. 8.

Figure 2:
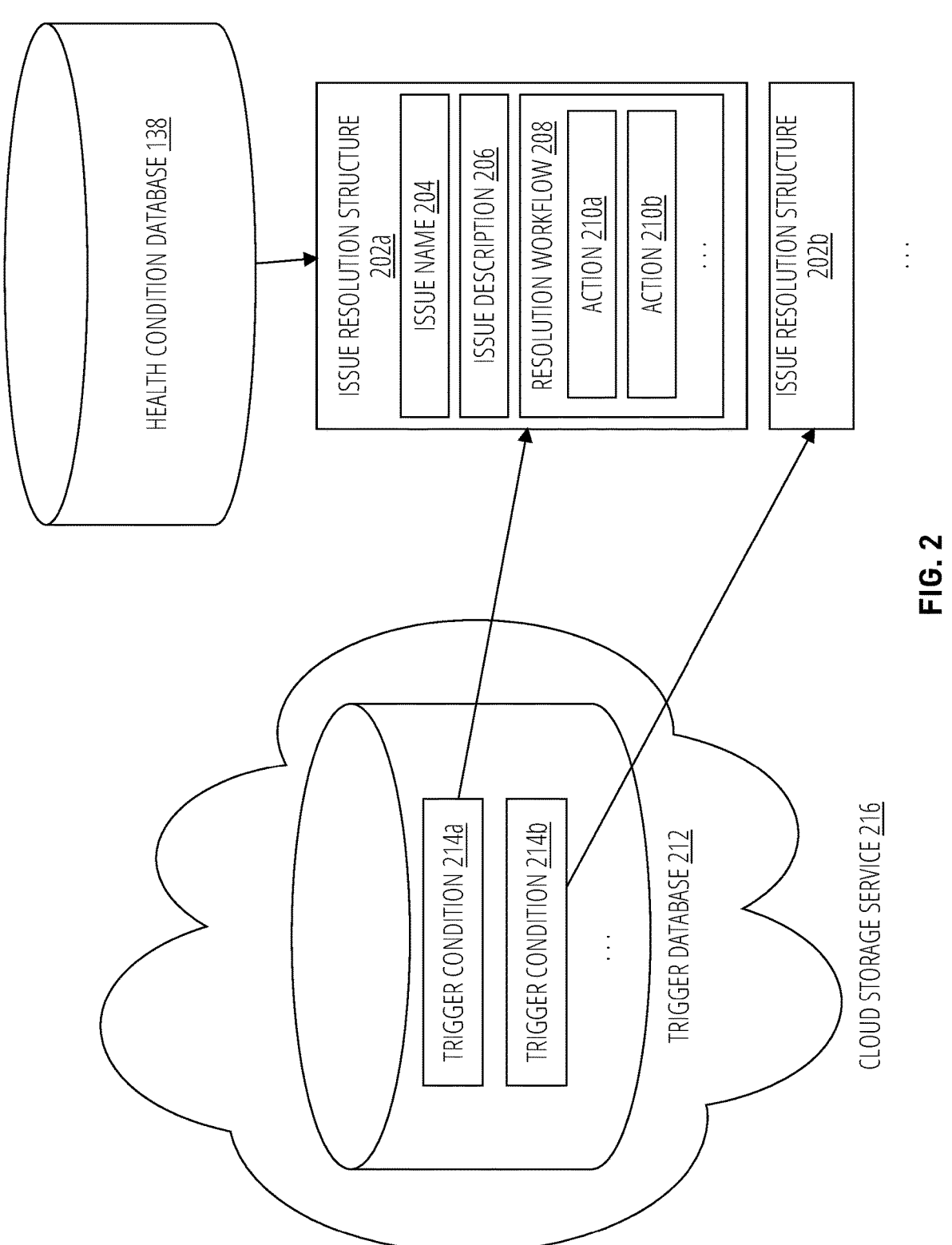
FIG. 2 illustrates exemplary data structures in accordance with one embodiment.
Figure 6:
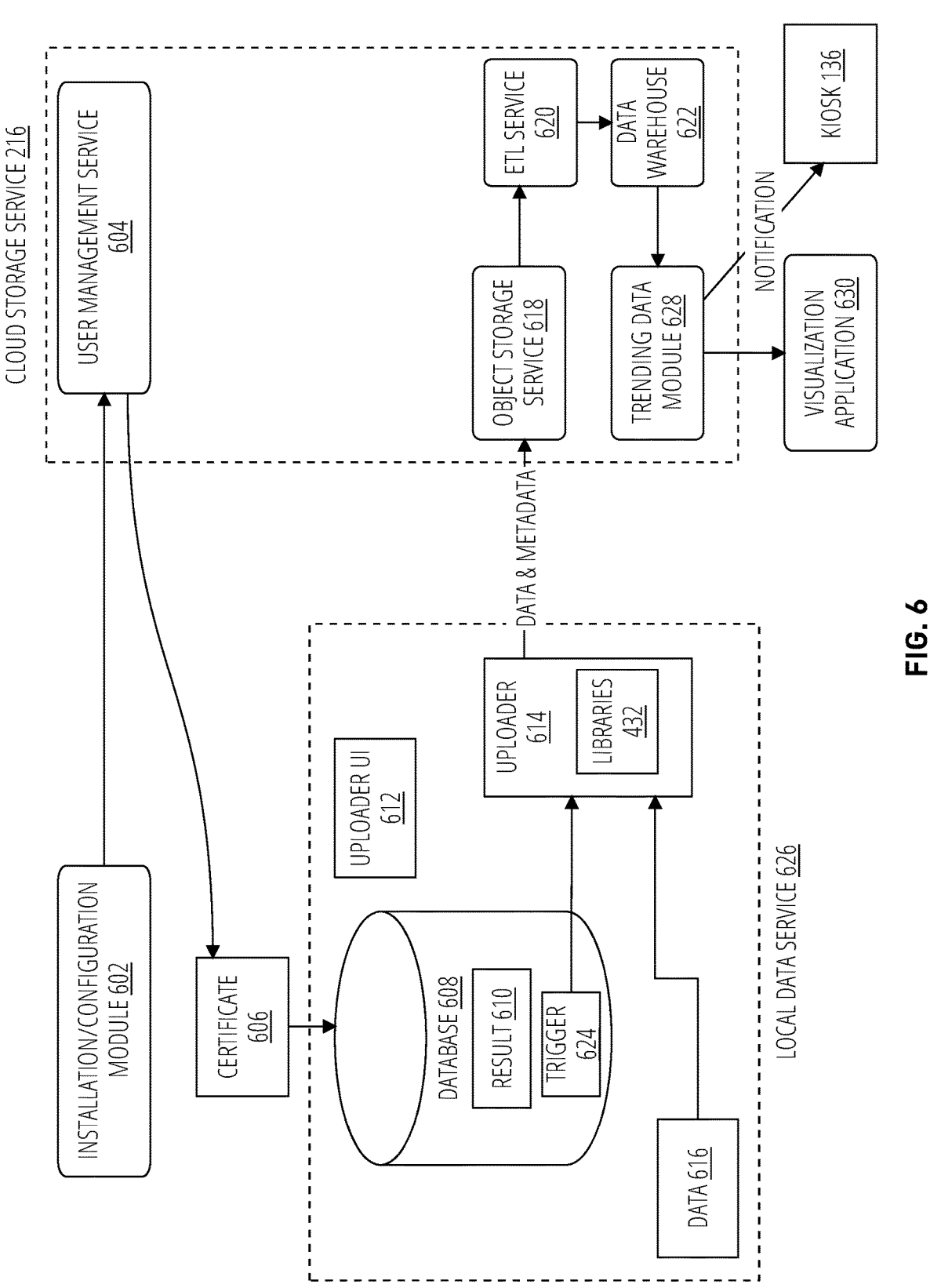
FIG. 6 illustrates an an environment with an uploader and cloud storage service in accordance with one embodiment.

FIG. 2 depicts exemplary data structures used by the kiosk 136 and other associated devices, such as the devices of a cloud storage service 216 that receives and processes data and other information from the analytical chemistry system (see, e.g., FIG. 6).

As the data/information is received by the cloud storage service 216, the cloud storage service 216 may identify in the data trends, patterns, values that exceed maximum or minimum thresholds, etc. These identified features may be compared to one or more trigger conditions 214a, 214b, . . . in a trigger database 212.

The triggers may be associated with patterns or thresholds in the data being received from a laboratory analytical instrument—for instance, an issue may be identified when the data exhibits artifacts such as peak tailing, peak fronting, split peaks, peak distortion, extra peaks, retention time drifts, sudden retention time changes, baseline drift, baseline noise, broad peaks, loss of resolution, etc.) Alternatively or in addition, the triggers may be associated with patterns or thresholds in sensor readings that monitor various aspects of the instrument (e.g., a flow rate sensor, pressure sensor, temperature sensor, etc.).

The trigger conditions 214a may involve a comparison, such as comparing a data/sensor value to a threshold, comparing a rate of change of data/sensor values to a predetermined value, detecting that a value has exceeded a threshold for more than a predetermined amount of time, comparing the average of the values over a period of time to a predetermined threshold, determining that the values have exceeded a threshold more than a predetermined number of times over a predetermined period of time, etc. Trigger conditions may also involve combinations of comparisons (e.g., triggering when condition A or condition B are met, or only triggering when both condition A and condition B are met; any suitable boolean or logical combination may be used)

Many different types of maintenance and/or diagnostic issues can be flagged through the triggers. Examples include, but are not limited to, a system leak, lack of pressure or flow, high or low back pressure, fluctuating pressure or temperature, etc.

Each of the trigger conditions may be associated with one or more resolution workflows 208 configured to address the problem that caused the trigger condition. To that effect, a health condition database 138 may store data structures representing different problems in the form of issue resolution structures 202a, 202b, etc. An issue resolution structure may be used by the kiosk 136 to display information about the problem and its potential solutions, and to execute or suggest corrective actions to address the problem.

For example, the issue resolution structure 202a may include an issue name 204, which identifies the issue (e.g., "system leak"). The issue name 204 may be a relatively short identifier that briefly describes the issue for a user. The issue resolution structure 202a may further include a more detailed issue description 206, which may describe the problem in more detail and/or describe the values or patterns in the data/information that gave rise to the trigger condition that triggered the issue resolution structure 202a.

The issue resolution structure 202a may further include a resolution workflow 208 made up of one or more actions 210a, 210b, . . . . The actions may represent adjustments that may be made to the laboratory analytical instruments or associated devices that form part of the steps in a sequence configured to resolve the problem. For example a first action 210a in an issue resolution structure 202a configured to resolve a system leak might involve stopping the flow of an analyte through the instrument. The actions performed by any given resolution workflow 208 may depend on the issue being resolved.

The actions may include logic or source code configured to make an automatic adjustment to a laboratory analytical instrument (e.g., a command to close a valve, an instruction to adjust a pump speed, an invocation of a power-down or power-up method, etc.). The actions may also or alternatively include explanatory text describing actions being performed automatically and/or instructions to perform actions manually).

Some of the actions may be automatically executed without user intervention (beyond, e.g., receiving an input from the user indicating that the user wishes to execute the resolution workflow 208). Others may be capable of automatic execution but may be presented as an option for the user to select on the display of the kiosk; these options may not be automatically executed, but may be executed upon receiving a selection from the user.

Other actions may involve manual resolution steps to be performed by a user, such as prompting the user to perform certain maintenance activities. For instance, in the example of a leak in the liquid chromatograph 104, the system might automatically halt the flow, and might display further steps that the user can take to potentially resolve the problem (like replacing a gasket or a fitting, tightening the injector port seal, cleaning a filter, etc.).

In this latter case, the explanatory text may include an interactable element that, when selected, signals that the user has performed the manual steps suggested by the workflow. The kiosk 136 can then proceed to run system diagnostics to determine whether the action has resolved the issue. If so, the kiosk 136 flags the issue as resolved and removes it from the interface. If not, the kiosk 136 may proceed to the next action in the workflow.

A particular issue resolution structure 202a may include more than one resolution workflow 208, as when several different possible workflows could be used to resolve the problem. In this case, the interface of the kiosk (see FIG. 3) may allow the user to choose between different workflows. Alternatively or in addition, a given trigger condition might be associated with multiple different issue resolution structures, as when a trigger condition might signify two or more possible problems. More than one trigger condition may be associated with the same issue resolution structure 202a.

One advantage of using the structures depicted in FIG. 2 is extensibility. By adding new trigger conditions 214a, 214b, . . . to the trigger database 212 and linking the trigger to an issue resolution structure 202a, 202b, etc. from the health condition database 138, the system can be taught to recognize and respond to new problems or issues. Similarly, if a new resolution workflow 208 is developed for a known issue, the new resolution workflow 208 can be swapped into the issue resolution structure 202a (or a new issue resolution structure 202*a* may be created for the new resolution work-flow 208) to immediately improve the problem solving capabilities of the system.

Figure 3:
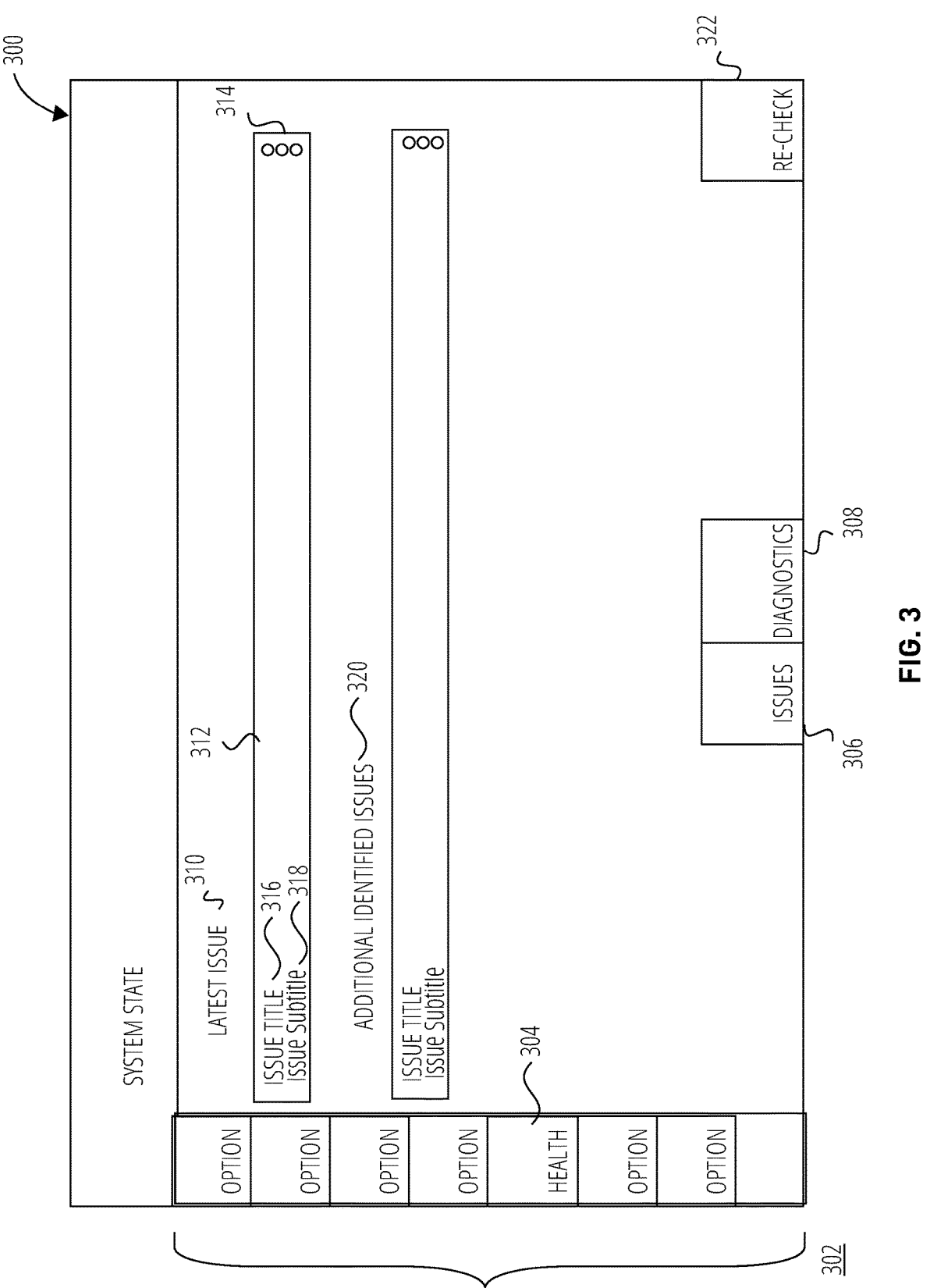
FIG. 3 illustrates an exemplary user interface in accordance with one embodiment.

FIG. 3 depicts an interface 300 for displaying information from the issue resolution structure 202*a* and guiding a user through issue resolution. The interface 300 may be displayed on the kiosk 136.

FIG. 3 depicts a particular view for addressing system health issues. The view depicted in FIG. 3 may be one of many possible views accessible through the kiosk 136 (which may handle other tasks, such as performing a setup of the analytical chemistry system, adjusting system set-tings, viewing data, displaying and adjusting maintenance schedules, etc.). A navigation pane 302 may allow a user to switch between different views; selecting a system health tab selector 304 in the navigation pane 302 may cause the health view depicted in FIG. 3 to be displayed.

Within the health interface 300, the most recent issue(s) that have been triggered may be displayed in a recent issues subinterface 310. For example, the recent issues subinterface 310 may display the single most recent issue identified, a predetermined number of recently-identified issues, all issues that have been identified since the health interface 300 was last loaded, etc.

The recent issues subinterface 310 may include one or more issue elements 312. Each issue element 312 may correspond to a particular recent issue identified and may reflect information from an issue resolution structure 202*a*. For example, an issue element 312 may include an issue name 316 that reflects the issue name 204 from the issue resolution structure 202*a*, an issue description 318 that reflects the issue description 206 from the issue resolution structure 202*a*, etc. Any issues that have not yet been resolved but that are not reflected in the recent issues subinterface 310 may be displayed in an additional issues subinterface 320.

The issue element 312 may include a context menu element 314 that causes a context menu to be displayed. The context menu may, for example, allow the user to dismiss the issue (causing the issue to be removed from the interface 300 or moved into the additional issues subinterface 320). Further, the context menu may include an option to re-test for the specific issue identified in the issue element 312 (e.g., checking to see whether the issue's triggering condition is still met).

In some embodiments, the next action 210*a* from the resolution workflow 208 may be displayed in the issue element 312, along with explanatory text describing what the action 210*a* will do automatically (or instructions for performing the action 210*a* manually). Selecting the issue element 312 may cause the indicated action 210*a* to be performed automatically. When the automatic action is performed, the interface 300 may be updated to display the next action 210*b* from the resolution workflow 208, and selecting the issue element 312 again may cause the next action 210*b* to be performed. Alternatively or in addition, the system may advance through multiple actions with a single selection of the issue element 312.

In some embodiments, the next action 210*a* may be a manual action. In this case, selecting the issue element 312 may cause a pop-up window or similar interface element to be displayed, where the window describes how to perform the manual action. The window may include a selectable element that a user can select to indicate that the manual action has been performed, which can advance the resolution workflow 208 to the next action 210*b*. Alternatively, select-ing the issue element 312 directly from the interface 300 when a manual action 210*a* is displayed may indicate that the action 210*a* has been performed and may cause the resolution workflow 208 to advance to the next action 210*b*.

Some embodiments refer to receiving a selection of explanatory text. This may involve selecting the issue ele-ment 312, the issue description 318, a selectable element related to the explanatory text (e.g., a selection of a button configured to perform the next action 210*a*, etc.). Selecting the explanatory text may involve, e.g., selecting the text on a touch screen device (for example, by registering a haptic contact on an area of the display corresponding to the text). It might also involve receiving a selection of an interface element, such as a button or icon, that is associated with the explanatory text, issuing a voice command to execute the workflow associated with the explanatory text, and other similar input options.

After an issue has been resolved, the associated issue element 312 may be removed from the interface 300. In some cases, the system may automatically detect when the issue has been resolved (e.g., by determining whether the trigger condition that gave rise to the issue continues to persist). In others, a user might trigger the kiosk 136 to manually re-check the analytical chemistry system for the presence of the issue (and/or other identified issues, and/or new, previously unidentified issues). Accordingly, the inter-face 300 may include a system health check element 322 configured to cause the system to check the system to determine if any of the triggers in the trigger database 212 are triggered.

The depicted interface 300 is suitable for displaying and resolving identified system issues. In some cases, a user may wish to view diagnostic information (e.g. sensor readouts, the values that give rise to trigger conditions, etc.). To that end, a user can select a diagnostics selection element 308 to display a diagnostics view that includes this information. The user can switch back to the issues view by selecting an issues selection element 306.

Figure 4A:
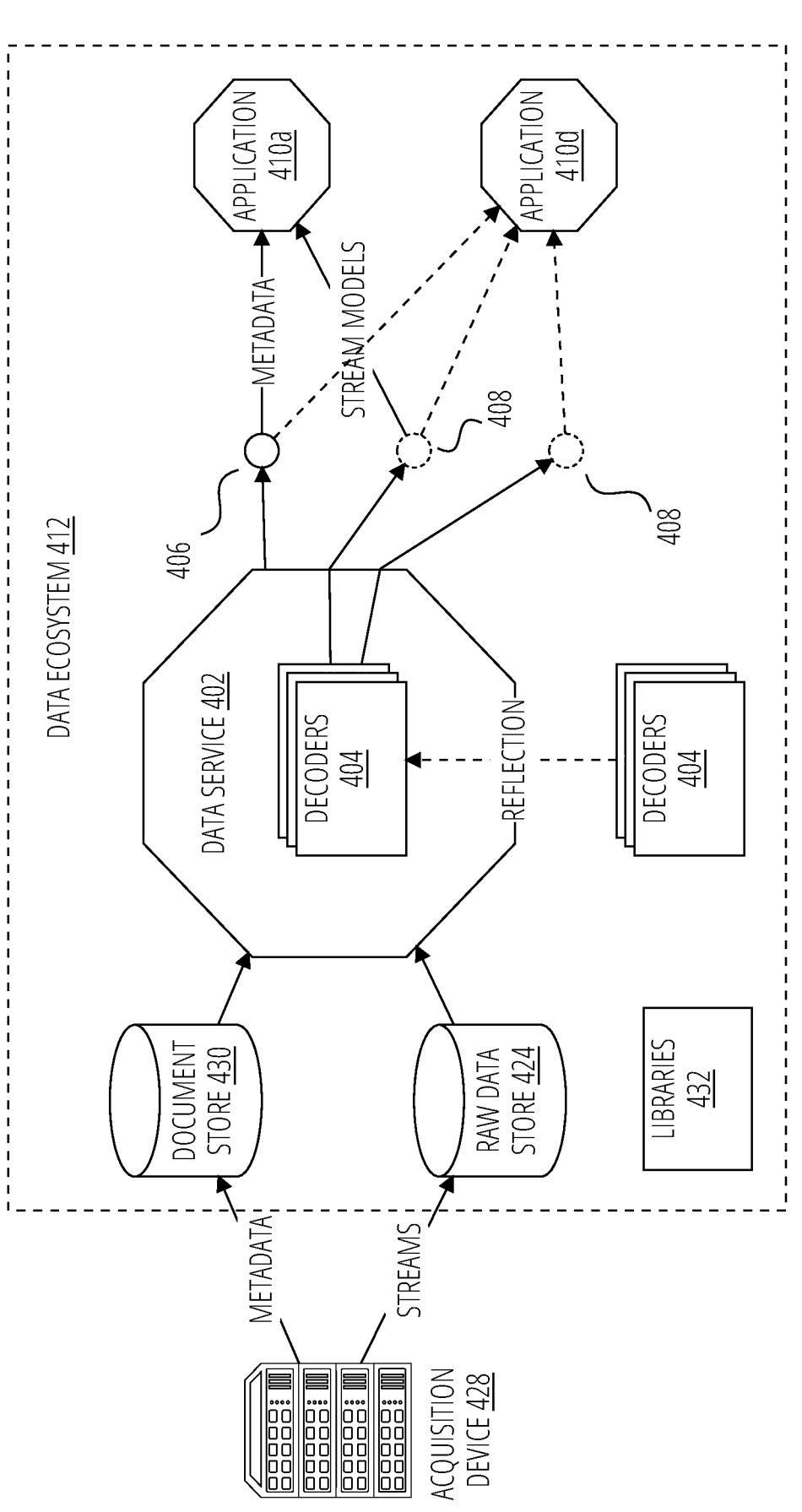
FIG. 4A illustrates a first exemplary data processing ecosystem in accordance with one embodiment.

FIG. 4A depicts an exemplary data ecosystem 412 for storing and retrieving chromatography data.

A chromatography acquisition 428, such as a spectrom-eter, chromatography, or other device, may perform and output measurements (e.g., as a stream of readings formatted according to a data type that is specific to the acquisition 428 and/or settings applied to the acquisition 428). Those mea-surements may be stored in a raw data store 424.

In one example, the acquisition 428 may acquire samples using an acquisition controller service. The acquisition con-troller service may submit the samples, via a RESTful API call, to an acquired data receiver autonomous service. The acquired data receiver autonomous service may create a sample set, which represents the multiple samples sent for analysis into an instrument. In other words, a sample set is an organized sequence of several injections that were sent into the chromatography apparatus.

The raw data raw data store 424 may include data from multiple different chromatography apparatuses and/or chro-matography apparatuses operating in multiple different acquisition modes. Accordingly, the data processing envi-ronment acts as a single source of data for applications, regardless of which device generated the data (or which mode the data was operating in). Any application calling into the ecosystem can be sure that any acquired data can be accessed and processed appropriately.

The sample set may be stored in a sample set model store, while injection raw data blobs may be sent to a separate acquired data raw blob store. The data may generally be stored in an oracle database as one or more models, which may represent a serialized format for storing the data. The serialized format may be a proprietary format. The models can be streamed to various applications and/or requested via interface calls. One or more libraries 432 built into the data ecosystem 412 may be capable of reading the models and deserializing them by converting them into basic modules. The libraries 432 may be, for example, dynamically linked libraries (DLLs) for the data ecosystem 412. In addition to deserializing the models, the libraries 432 may also describe derived channels in the data by defining how to transform measured data into a different type, format, or organization of data.

The acquisition 428 may also generate metadata describing the configuration of the acquisition 428, details of the experiment being performed, a decoder configured to decode data generated for the experiment, etc. This metadata may be stored in a metadata catalog 130. As with the raw data store 424, the metadata catalog 130 may store metadata associated with multiple different acquisition devices in multiple different configurations.

The raw data may be decodable by a set of decoders 404, where each decoder is associated with a particular data type. For example, the decoder may be associated with a particular type of raw data generated by a chromatography instrument in a specific acquisition mode. That instrument may output a stream of raw data, including (e.g.) binary data, arrays of information, etc. The decoder may be programmed to parse a stream of raw data generated by such an instrument so that the data stream can be meaningfully interpreted.

In some embodiments, a single decoder may be associated with multiple data types; in further embodiments, multiple versions of the same decoder may each be associated with different data types. The decoders 404 may be embedded within a data service 402, such as an autonomous service (e.g., via reflection).

Each of the autonomous services may expose one or more endpoint interfaces. A particular decoder may be associated with each endpoint interface. The decoder may be configured to interpret the raw data that is associated with the endpoint interface.

For example, these endpoints may be Representation State Transfer (REST) endpoints capable of receiving RESTful Application Programming Interface (API) calls. An endpoint interface may receive a request for raw data acquired by a chromatography instrument. The data ecosystem 418 may expose multiple endpoint interfaces; for example, each autonomous service may be associated with and may expose at least one endpoint interface. An application 410a. 310c configured to process the raw data may call into the endpoint interface using an API call in order to retrieve the data.

The autonomous service (or another construct) may retrieve the requested raw data from a raw data store, apply the decoder to the raw data to generate decoded data, and may return the decoded data in response to the original request. For example, the autonomous service may apply the decoder to the raw data and provide decoded data to the requesting application, or the autonomous service may identify the decoder and provide it (or a location at which it can be accessed) to the requesting application along with the raw data (or a location of the raw data). In the latter case, the application may decode the data with the decoder.

Returning to the above described example, the autonomous service may retrieve the sample set models from the sample set model store and/or may retrieve the raw data blobs from the raw data blob store. The data may be decoded according to the decoder, and either version of the data (the raw data blobs or the sample set) may be provided to the application. The reason for supplying either or both of the raw data blobs and the sample set models is that the application may be tuned, for performance reasons, to use one or the other representation of the data.

By exposing the endpoint interfaces in this way, an application 410a, 310c can request data acquired by a chromatography instrument without needing to understand how to interpret the data. Furthermore, an application 410a, 410d may deposit the data in a known or common format into a central repository along with metadata indicating, e.g., when the data was received by the application, when the data was processed by the decoder, the identity of user who captured the data, the identity of the instrument that generated the data, and other information describing how and when the data was acquired. Accordingly, when new types of instruments are brought online (potentially outputting data in a different streaming format), it is not necessary to reprogram each application 410a. 310c that might use that data. Because each application 410a, 410d need not be programmed with specifics of how to interpret each different type of data stream, more different types of data can be made available to the applications, which allows for more complex analyses. This configuration also allows multiple different types of data to be stored together in a common source structure, simplifying data retrieval and storage.

In the depicted embodiment, the endpoint interfaces are of two types. A first type serves as a catalog endpoint 406, which is configured to receive requests for metadata. In response to receiving a request for metadata on the catalog endpoint 406, the data service 402 may identify the corresponding metadata in the metadata catalog 130. The data service 402 may then either return the requested metadata to the requesting application, or may return the location of the metadata so that it can be retrieved by the application as needed.

Another type of endpoint interface may serve as a data endpoint 408. There are generally a number of data endpoints 408 in the data ecosystem 412 corresponding to a number of data types that the raw data store 424 is capable of supporting. Each data endpoint 408 is characterized by a data type. When an application requests data, it may call into the raw data store or the metadata catalog to identify the type of the data; for example, the data may be tagged with a codec key that is stored with the data and/or in the metadata. The endpoint interfaces may be callable based on the data type, so once the data type is known the requesting application may identify the appropriate endpoint interface to decode the data and may formulate an appropriate RESTful API call to communicate with the interface. This provides an efficient way for the application to identify and call into the autonomous service that is capable of decoding the data.

Consequently, incoming requests are separated into metadata-specific requests and data-specific requests. Each is handled by a different type of endpoint. This helps to segregate incoming requests and provides requesting applications with a known endpoint to target for appropriate types of requests.

In this example, a single autonomous service handles requests for metadata and each different data type. Although straightforward to implement, it may be necessary to update the entire autonomous service every time one of the data types is changed, or a new data type is added. This can cause unnecessary downtime. Furthermore, the autonomous service needs to be capable of accessing both the metadata catalog 130 and the raw data store 424. These issues can be alleviated by dividing responsibility for different tasks between different autonomous services. An example of such an environment is described next in connection with FIG. 4B.

Figure 4B:
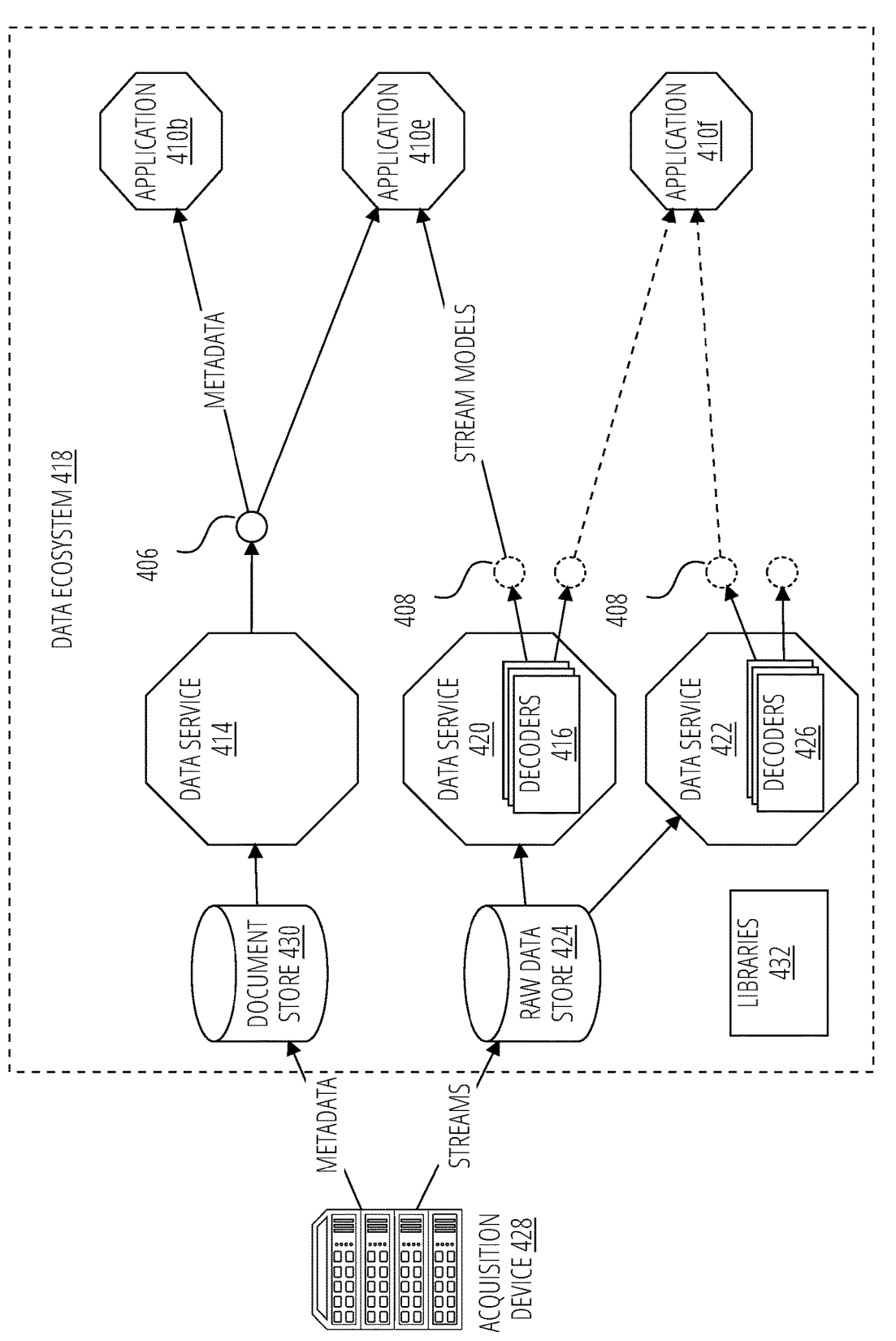
FIG. 4B illustrates a second exemplary data processing ecosystem in accordance with another embodiment.

FIG. 4B illustrates an alternative configuration in which (1) metadata requests are all directed to a particular data service 414, which interfaces with the document store 430 but not the raw data store 424, and (2) data requests are submitted to any of a number of additional autonomous services, each of which has a particular decoder or set of decoders embedded and handles requests specific to the data type of its embedded decoders.

In this configuration, multiple data services 420, 322, etc. service incoming requests for data. Furthermore, at least one data service 414 is specifically configured to respond to requests for metadata. The data service 414 responding to metadata requests does not respond to requests for data, and accordingly does not need to implement any functionality related to the decoders. Similarly, the data services 420, 322, etc. responding to data requests do not need to implement any of the functionality for querying the metadata catalog. When new data types are added, a new autonomous service implementing the decoder for the new data type may be added, or an existing autonomous service may be updated with the new functionality. Meanwhile, most of the autonomous services can remain unchanged. Similarly, if the metadata catalog API is ever changed, only the metadata-handling autonomous service needs to be updated.

The raw data raw data store 424 includes data of multiple different data types. Collectively, the autonomous services may be configured to decode each of the plurality of different data types. For example, the multiple different data types may be included in an interface specification, which may describe how to decode the various different types. The interface specification may be capable of being implemented, at least in part, by each of the autonomous services by implementing corresponding data endpoints 408 and decoders 416, 324. Each data service 420, 322 may be associated with a different set of decoders 416, 324, although there may be some overlap in the decoders supported by different data services. However, no single data service implements all of the decoders, so the functionality for decoding different types of data is distributed across multiple data services. Therefore, different parts of the interface specification may be split between multiple different autonomous services, so that each implements a part, but not all, of the interface specification. Each part of the interface specification may be implemented by at least one of the autonomous services so that, collectively, the group of interface services implements the interface specification.

Because each autonomous service is tasked with only implementing a portion of the interface specification, each autonomous service can be made simpler (since it need not be concerned with providing decoders and endpoint interfaces for portions of the interface specification that it does not implement). New autonomous services can be easily added to deal with new capabilities, and it is not necessary to take down all of the autonomous services when one decoder needs to be updated.

Figure 5:
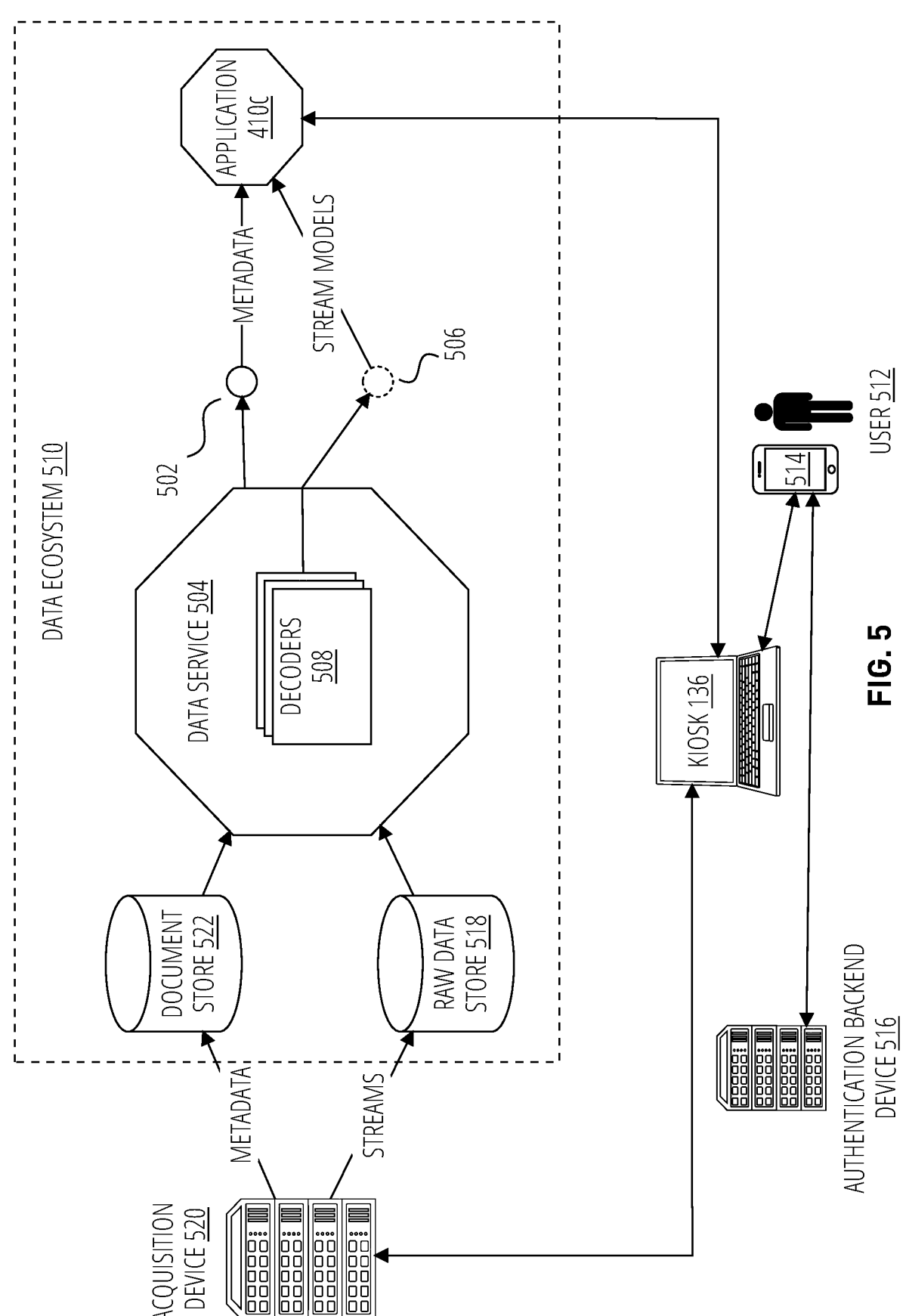
FIG. 5 illustrates a first exemplary data processing ecosystem in accordance with one embodiment.

FIG. 5 depicts an exemplary data ecosystem 510 for storing and retrieving chromatography data. This embodiment may be used in connection with the embodiment depicted in FIG. 4A (in which case the decoders 508 may correlate to the decoders 404), the embodiment depicted in FIG. 4B (where the decoders 508 may correlate to the decoders 416, 426), or any other suitable configuration.

A kiosk 136 may be a dedicated computing device for performing a variety of tasks, such as authentication and authorization, system setup, system health monitoring, etc.; alternatively, this functionality may be built into another, general-purpose device. The kiosk 136 may be capable of interacting with an acquisition 520 and/or an application 410c (among other possibilities, such as the analysis device 126 or client browser 132) to perform system health checks.

To that end, the kiosk 136 may include a short-range wireless transmitter/receiver (e.g., a near field communication, or NFC, reader). The kiosk 136 may be configured to receive, via the short-range wireless transmitter/receiver, a wireless transmission of a secure token from the user's mobile device 514. The secure token may include login credentials for the user 512 and, optionally, an identification of a device or application that the user is attempting to access. The secure token may be encrypted.

In some embodiments, the user 512 may be required to log in to an application on their mobile device 514 before being presented with an opportunity to transmit the login credentials to the kiosk 136. This provides an additional degree of security, since an unauthorized user would need to be in physical possession of the user's mobile device 514 and know the user's login name and password in order to authorize use of the data ecosystem 510 via the kiosk 136.

In some embodiments, the user may not need to log into the application, or a previous login may continue to provide access for a period of time (e.g., six hours, one day, one week, etc.). The period of time may be predetermined based on the context and security requirements of the organization maintaining the data ecosystem 510, or may be dynamically determined based on current security conditions. If a previous authorization is in effect, the kiosk 136 may automatically receive the short-range wireless communication unprompted by the user 512. For example, the kiosk 136 may continuously prompt for a new login via the short-range wireless communication. When the user 512 brings their mobile device 514 in close proximity to the kiosk 136, the mobile device 514 may receive the prompt from the kiosk 136 and automatically respond with the secure token. The mobile device 514 may be configured to run an application in the background in order to detect and respond to the prompt automatically. Accordingly, the user can be logged into the data ecosystem 510 via the kiosk 136 without needing to remove the mobile device 514 from the user's pocket, bag, or other storage location.

The login credentials may be sent from the kiosk 136 to an authentication backend device 516, such as a server, for validation. The authentication backend device 516 may verify that the user's login credentials are valid (e.g., that the credentials correspond to a real user), and that the user is authorized to use the device or application for which access is requested. The authentication backend device 516 may send a confirmation or rejection to the kiosk 136, depending on whether the authentication backend device 516 can verify the user's credentials.

In some embodiments, the login credentials in the secure token may include a data value representing a universal access key common to all authorized users of the system. The authentication backend device 516 may recognize the universal access key and permit access to the data ecosystem 510. Use of the universal access key may be controlled by the user's application on the mobile device 514 so that if authorization needs to be removed from a given user, the user's application can be configured not to provide access. The user's application can be so configured when logging into the application on their mobile device (which may involve connecting to an authentication server; this may be the same authentication backend device 516 that communicates with the kiosk 136 or may be another authentication device). In this way, authentication can be performed in a relatively simple manner because the authentication back-end device 516 only needs to recognize one set of credentials: the universal access key.

In other embodiments, each user may be assigned their own access key. Although this may be more complicated from the perspective of the authentication backend device 516, it may allow for individual users to be quickly authorized or de-authorized by adding their unique access key to a list stored at the authentication backend device 516.

The kiosk 136 may be configured to send a command signal to a connected device authorizing a user 512 to use the connected device. In response to receiving the command signal, the connected device may become unlocked and capable of processing instructions from the user (received directly on the connected device, through the kiosk 136, via the user's mobile device 514, or through another device such as the analysis device 126). In the absence of such a command signal, the connected device may be locked and may refrain from accepting or processing commands from any unauthorized users.

When the user logs in or logs out through the kiosk 136, the kiosk 136 may generate an instruction to create an audit record storing the user's identifier, the action taken (e.g., logging in or logging out), a timestamp, and any other relevant data used in an audit record. The kiosk 136 may generate the audit record and transmit it to a device responsible for maintaining an audit trail, such as the analysis device 126 and/or audit log 134. Alternatively or in addition, the audit record may be generated by another device, such as the analysis device 126 or authentication backend device 516. In some embodiments, the kiosk 136 and mobile device 514 may work together to create the audit record.

Once logged into the kiosk 136, the user may display the health interface 300, as shown in FIG. 3. The kiosk 136 may communicate with connected devices, such as the acquisition 520, and/or cloud computing device (see FIG. 6) in order to perform system health checks.

FIG. 6 depicts an exemplary environment including an uploader 614 and a cloud storage service 216. The uploader 614 may be configured to upload data stored in a local data service 626, such as a database system. An example of a local data service 626 is the ORACLE DATABASE MANAGEMENT SYSTEM (DBMS).

The environment includes an installation/configuration module 602 for the uploader. The installation/configuration module 602 may include a setup file that installs the uploader 614 on a computing device. As part of the installation of the uploader 614, the installation/configuration module 602 may perform a handshaking process with the cloud storage service 216 that authenticates the uploader 614 with the cloud storage service 216. To that end, the installation/configuration module 602 may communicate with a user management service 604 of the cloud storage service 216 to authenticate the user, organization, or other entity installing the uploader 614. An example of a user management service 604 is the COGNITO service provided by AWS, which registers users with the cloud storage service 216, establishes tenancies, and maintains and enforces access rights.

Once authenticated, the installation/configuration module 602 may install the uploader 614 on the computing device. The user management service 604 may provide a certificate 606 evidencing the authentication, which may be installed with the uploader 614 on the computing device. When uploading data, the uploader 614 may use the certificate 606 to authenticate itself to the cloud storage service 216.

Data stored in the database 608 of the local data service 626 may be organized into projects. Each project may represent a user-configurable collection of data sets. The data sets may be updated as new results are received from experiments. The uploader 614 may upload all data in a project (referred to as "seeding") or may upload data related to particular results as they are received (referred to as a real-time trickle).

The uploader 614 may include an uploader UI 612 allowing the user to select data to be manually seeded into the data warehouse 622. In order to upload data in the real-time trickle, the database 608 may be configured with one or more database triggers 624. The triggers 624 may be configured to fire when new data is added to the database 608. Each trigger 624 may be associated with a stored procedure within the database 608, where the stored procedure sends an API call (such as a REST call) to the uploader 614. The uploader 614 may be configured to listen for the REST call and begin uploading the data that triggered the call to the cloud storage service 216.

In order to facilitate queries, the database 608 may store the data in a materialized view. The materialized view may be precomputed based on the form of queries used by the local data service 626.

A goal of the uploader may be to transfer at least some of the data stored in the database 608 into a data warehouse 622. Because the data warehouse 622 will likely respond to many queries for the data, the 622 may store the data in a form that is optimized for read access. For instance, the data warehouse 622 may be a relational database such as AWS REDSHIFT.

The data warehouse 622 may need to store the data in a particular form in order to optimize for read access. This may differ from the form used to store the data in the database 608. Thus, the uploader 614, in conjunction with an object storage service 618 and an ETL service 620, may transform the data from a first data model used to store the data in the database 608 to a second data model used to store the data in the data warehouse 622.

To that end, the data may be uploaded to an object storage service 618 of the cloud storage service 216, such as AWS S3. The object storage service 618 may by a multi-tenant storage service that stores data in tenant-specific buckets. During installation, the installation/configuration module 602 may prompt the user to enter a tenancy ID or name that represents the user in the user management service 604. The tenancy ID/name may be stored in the local data service 626 so that the uploader 614 can isolate a specific user's data in a user-specific bucket of the object storage service 618.

In addition to the raw data, derived data and metadata may also be uploaded to the object storage service 618. The metadata may include, for example, a tenancy identifier that identifies a tenancy associated with a user of the uploader in the cloud storage service 216. Furthermore, the metadata may include a project identifier that indicates a project that the uploaded data belongs to. Still further, the metadata may include a channel identifier for stream files uploaded by the uploader.

The ETL service 620 may be configured to watch for new data entering the object storage service 618 (e.g., using a serverless compute service, such as AWS LAMBDA), transform it (e.g., into the second data model), and store the transformed data in the data warehouse 622.

A trending data module 628 may access data stored in the data warehouse 622 and analyze it to identify data trends.

The trending data module 628 may include artificial intelligence or machine learning (AI/ML) capabilities to identify the data and suggest the best way to visualize it. An example of a trending data module 628 suitable for use with exemplary embodiments is AWS QUICKSIGHT.

The trending data module 628 may identify commonly requested configurations and select the most appropriate visualizations for them. For example, the trending data module 628 may identify that available data contains a set of fields that can be used to perform a particular type of analysis. Alternatively or in addition, a user may select a set of fields and the trending data module 628 may recognize that the selected fields commonly correspond to a particular type of analysis or visualization.

Examples of types of analyses that may be recognized by the trending data module 628 include: method performance, column performance, product performance, product stability, system suitability, site performance, system performance, and analyst performance.

A method may refer to an analytical method used to analyze chemistry data. The trending data module 628 may recognize that a method is being analyzed when the available fields in the data set include fields that identify a method or method steps, or that quantify the performance of the method (e.g., by measuring the accuracy of the method against a known standard or by comparing the settings or parameters of the standard to a known best configuration).

A column may be a column of an analytical laboratory instrument, such as a gas or liquid chromatograph. Column performance may be measured by evaluating the repeatability of column measurements, or by determining how accurate the column readings are when compared to a known standard. The trending data module 628 may determine that column performance is being analyzed when the fields in the data set include an identifier of a column used to make the measurements and/or parameters commonly used to judge column performance (such as column age, a most recent calibration time, etc.).

Product performance and stability may refer to the potency, quality, strength, and/or stability (e.g., degradation in performance over time) of given analyte or compound. The trending data module 628 may determine that product performance or stability are being measured when the fields of the data set include an identifier of the product being considered, and/or measurements of the product's concentration, quality as compared to a reference product (such as a pure sample of the product), amount of impurities, etc., especially (in the case of stability) when these values are measured over a period of time.

System suitability may refer to the suitability of one or more configured analytical laboratory instruments for achieving the types of measurements required by an analytical chemistry experiment. The trending data module 628 may determine that system suitability is being measured when the fields of the data set include typical measurements of system suitability, such as an identifier for the system being analyzed, values for the configuration of the system, identifiers for the types of products that the system is configured to analyze, and/or measures of performance or the quality of results generated by the system.

Site performance may refer to the performance of a group of instruments at a given location (such as an analytical laboratory). System performance may refer to the performance of one or a selected group of laboratory analytical instruments (e.g., as measured through the repeatability of results, how well the instruments measure known standards, maintenance schedules, etc.). The trending data module 628 may determine that site performance is being analyzed when the fields of the data set include an identifier that associates particular instruments with a site (such as a laboratory identifier), especially if multiple instruments in the data set are associated with a particular site.

Analyst performance may describe the accuracy or efficiency of a particular user, potentially across multiple different instruments. The trending data module 628 may determine that analyst performance is being analyzed when the fields of the data set include an identifier for the analyst who generated the results, as well as measurements of the quality of the results generated by the analyst.

Based on the type of analysis being performed, the trending data module 628 may select an appropriate type of visualization (e.g., a chart, a particular type of graph such as a line graph or bar graph, a table, etc.). The type of visualization may be selected, at least in part, based on the dimensionality of the data. For example, if the selected fields represent a single data point, the value of the data point may be displayed in the visualization. If the data is two-dimensional, then a line graph may be an appropriate type of visualization.

The visualizations computed by the trending data module 628 may be presented in a visualization interface of a visualization application 630. The visualization application 630 may be an application running on a client device or in a browser.

The trending data module 628 may also be used to trigger the triggers stored in the trigger database 212. When a trigger is activated, the trending data module 628 may send a notification to the kiosk 136 that identifies the trigger and/or the issue resolution structure 202*a* associated with the trigger.

Figure 7:
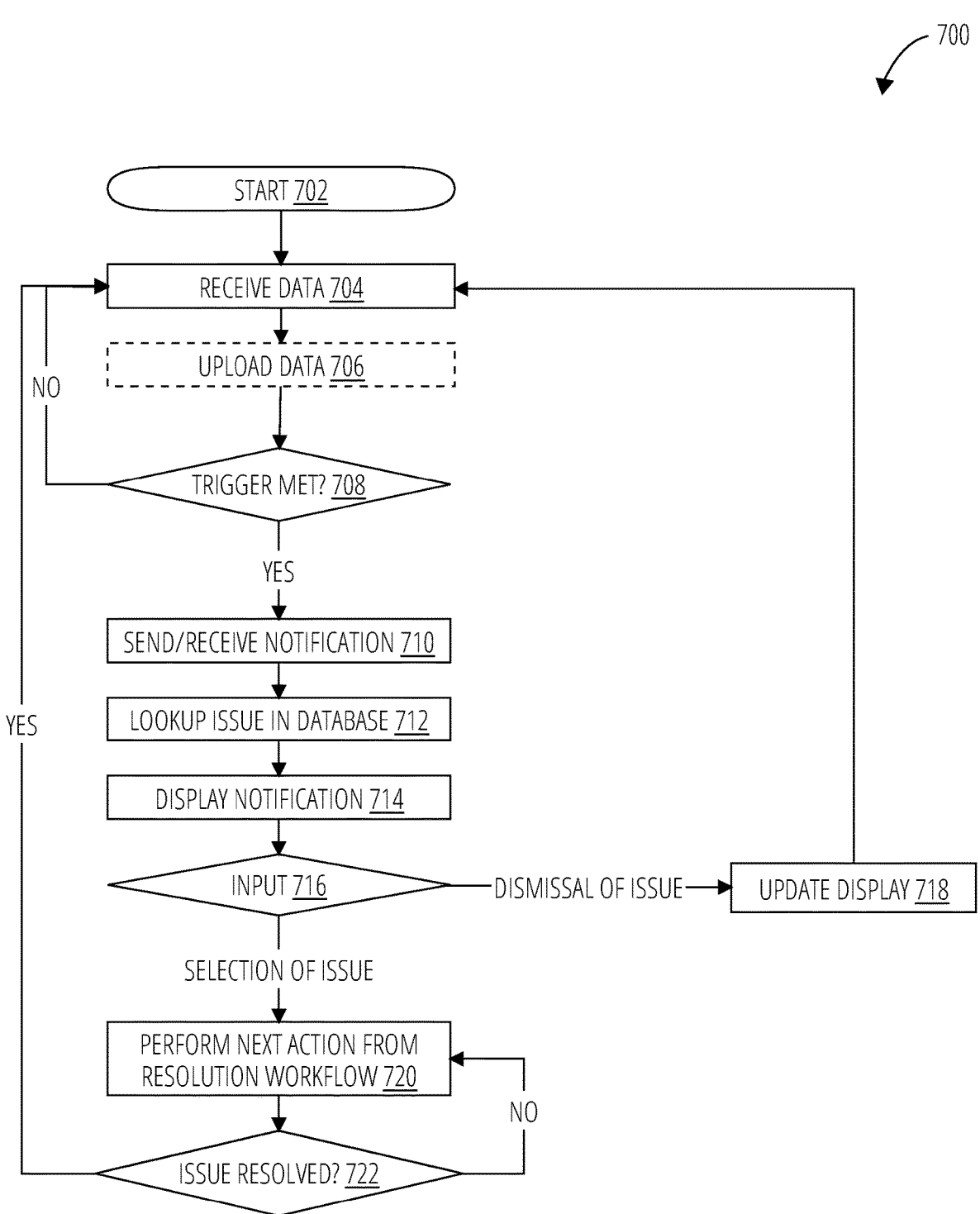
FIG. 7 depicts exemplary logic suitable for practicing an embodiment.

FIG. 7 is a flowchart depicting exemplary health monitoring logic 700 for performing a computer-implemented method according to an exemplary embodiment. The logic may be embodied as instructions stored on a computer-readable medium configured to be executed by a processor. The logic may be implemented by a suitable computing system configured to perform the actions described below.

Processing may begin at start block 702, which may be performed in response to the kiosk 136 starting up or a user logging into the kiosk 136.

In block 704, data associated with an analytical chemistry system may be received. The data may include output data from an analysis of a sample and/or sensor data describing a state of the device(s) in the system, among other possibilities. In general, any diagnostic or maintenance data useful to identify issues or problems with the analytical chemistry system may be provided. The data may be provided to a kiosk, an analysis device, a remote computing device, or any other computing device suitable for comparing the data (or information derived from the data) to the triggers in the trigger database.

In some embodiments, the data may be provided to a cloud computing environment (such as the one depicted in FIG. 6). Accordingly, in block 706, the data may optionally be uploaded to the cloud computing environment.

In decision block 708, the computing system at which the data was received (or a further processing system to which the recipient sends the data for processing) may determine whether a trigger condition has been met. To that end, the system may compare the data (or information derived from the data) to the triggers in the trigger database. Among other possibilities, detecting the trigger condition may involve comparing the data (or information derived from the data) to a maintenance limit or identifying a trend in the data (or information derived from the data).

If any of the triggers are met ("YES" at decision block 708), then processing may proceed to block 710. If not ("NO" at decision block 708, then processing may return to block 704 and the system may await new data.

In block 710, a notification that the trigger condition was met may be sent from the device that processed the data to the kiosk (or the kiosk may generate its own notification, if it identified the trigger). For instance, if the data was uploaded to a cloud computing service, the cloud processor that processed the data may generate the notification and send it to the kiosk. The notification may include an identification of the trigger condition that was met, an identification of an issue resolution structure 202a associated with the trigger condition, an identification of a problem or issue associated with the trigger condition (which can then be looked up in the health condition database 138), a copy of the associated issue resolution structure 202a, or any other suitable identifier that allows the kiosk to retrieve the relevant issue resolution structure 202a.

In block 712, the system may use the notification to look up the issue in the health condition database 138. The system may retrieve the relevant issue resolution structure 202a and may, at block 714, display a notification of the identified health issue in the interface 300. For example, the system may create an issue element 312 corresponding to the identified issue and add it to the recent issues subinterface 310. The system may optionally trigger an alert, such as a pop-up text alert, an email, an SMS message, an audio alert, or any other suitable alert flagging for an appropriate registered user that a new issue has been raised.

In decision block 716, the system receives and processes an input to the interface 300. In some cases, the user may dismiss the issue (e.g., through the issue element 312 context menu), at which point processing proceeds to block 718 where the display is updated to reflect the dismissal. For instance, the system may remove the issue element 312 associated with the issue from the interface 300 altogether, move it to the additional issues subinterface 320, or change the issue element 312 to reflect that the issue has been dismissed. Processing may then return to block 704 where the system awaits new data that may trigger the identification of further issues.

Alternatively, the user might select the issue in decision block 716. For instance, the user might select the explanatory text of the issue element 312. In that case, processing may proceed to block 720, where the next action from the workflow may be performed (automatically in some cases, or manually where appropriate).

The action may be performed automatically, without requiring the user to further interact with the interface 300 (beyond the initial selection of the issue to indicate that the associated workflow should be performed). The workflow may proceed through any actions that it can perform automatically, stopping when the issue is resolved, the workflow runs out of actions, or the workflow arrives at an action that needs to be performed manually.

The kiosk may be in direct communication with the analytical chemistry system so that it can execute the action to directly make the adjustment to the instrument. The action may be executed in real time in response to a user instruction.

In some embodiments, the issue element 312 may include explanatory text, such as first explanatory text that describes a problem and a solution, the solution linked to the action from the issue resolution structure. The system may receive a selection of the first explanatory text, and automatically perform the action from the issue resolution structure without further user interaction.

In decision block 722, the system determines whether the action performed at block 720 resolved the issue. Decision block 722 may be performed automatically after the action terminates, or may be triggered by a user (e.g., by selecting the system health check element 322 in the interface 300). At decision block 722, the system might, for example, check the most recent data received from the affected device(s) to determine whether the updated data still meets the trigger condition that triggered the original issue (and/or, optionally, other trigger conditions, which might indicate that the fix for the issue caused a different problem, or that the issue was masking another underlying problem).

Whether the issue is dismissed in block 716, resolved at block 722, or some other case pertains (e.g., an action was attempted that failed to solve the issue), the dismissal/action may be stored in a log. For example, the log may store the issue identified, the action taken (or the dismissal), the status of the issue (resolved/unresolved) and other relevant information about the issue. The log may be stored for review later and/or for use with machine learning/artificial intelligence algorithms to be able to address issues more effectively in the future.

If the issue was not resolved at decision block 722, processing may return to block 720 and the next action in the resolution workflow 208 may be performed. Note that not every action may necessarily trigger decision block 722—for example, if the action is a part of resolving the issue but is known to not be sufficient to resolve the issue (e.g., stopping the flow when a leak is detected), then decision block 722 may be omitted and processing may proceed to the next action. If the system runs out of actions to be performed in the resolution workflow 208 without resolving the issue, then a new notification may be generated indicating that more intensive corrective action is required. Optionally, the system may take precautionary steps at this point, such as shutting down the associated instrument.

If, on the other hand, the issue is resolved at decision block 722, then the display may be updated to reflect the fact that the issue has been resolved (e.g., displaying a success notification and/or removing the issue element 312 from the interface 300), and processing may return to block 704 where the system awaits further data that may be indicative of a new issue.

Although FIG. 7 depicts particular actions performed in a specific order, embodiments are not limited to the configuration shown in FIG. 7. It is contemplated that more, fewer, or different logical blocks may be implemented. Similarly, it is contemplated that the actions may be performed in a different order than the one shown in FIG. 7.

FIG. 8 illustrates one example of a system architecture and data processing device that may be used to implement one or more illustrative aspects described herein in a standalone and/or networked environment. Various network nodes, such as the data server 810, web server 806, computer 804, and laptop 802 may be interconnected via a wide area network 808 (WAN), such as the internet. Other networks may also or alternatively be used, including private intranets, corporate networks, LANs, metropolitan area networks (MANs) wireless networks, personal networks (PANs), and the like. Network 808 is for illustration purposes and may be replaced with fewer or additional computer networks. A local area network (LAN) may have one or more of any known LAN topology and may use one or more of a variety of different protocols, such as ethernet.

Devices data server 810, web server 806, computer 804, laptop 802 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 810, web server 806, and client computer 804, laptop 802. Data server 810 provides overall access, control and administration of databases and control software for performing one or more illustrative aspects described herein. Data server 810 may be connected to web server 806 through which users interact with and obtain data as requested. Alternatively, data server 810 may act as a web server itself and be directly connected to the internet. Data server 810 may be connected to web server 806 through the network 808 (e.g., the internet), via direct or indirect connection, or via some other network. Users may interact with the data server 810 using remote computer 804, laptop 802, e.g., using a web browser to connect to the data server 810 via one or more externally exposed web sites hosted by web server 806. Client computer 804, laptop 802 may be used in concert with data server 810 to access data stored therein, or may be used for other purposes. For example, from client computer 804, a user may access web server 806 using an internet browser, as is known in the art, or by executing a software application that communicates with web server 806 and/or data server 810 over a computer network (such as the internet).

Servers and applications may be combined on the same physical machines, and retain separate virtual or logical addresses, or may reside on separate physical machines. FIG. 8 illustrates just one example of a network architecture that may be used, and those of skill in the art will appreciate that the specific network architecture and data processing devices used may vary, and are secondary to the functionality that they provide, as further described herein. For example, services provided by web server 806 and data server 810 may be combined on a single server.

Each component data server 810, web server 806, computer 804, laptop 802 may be any type of known computer, server, or data processing device. Data server 810, e.g., may include a processor 812 controlling overall operation of the data server 810. Data server 810 may further include RAM 816, ROM 818, network interface 814, input/output interfaces 820 (e.g., keyboard, mouse, display, printer, etc.), and memory 822. Input/output interfaces 820 may include a variety of interface units and drives for reading, writing, displaying, and/or printing data or files. Memory 822 may further store operating system software 824 for controlling overall operation of the data server 810, control logic 826 for instructing data server 810 to perform aspects described herein, and other application software 828 providing secondary, support, and/or other functionality which may or may not be used in conjunction with aspects described herein. The control logic may also be referred to herein as the data server software control logic 826. Functionality of the data server software may refer to operations or decisions made automatically based on rules coded into the control logic, made manually by a user providing input into the system, and/or a combination of automatic processing based on user input (e.g., queries, data updates, etc.).

Memory 822 may also store data used in performance of one or more aspects described herein, including a first database 832 and a second database 830. In some embodiments, the first database may include the second database (e.g., as a separate table, report, etc.). That is, the information can be stored in a single database, or separated into different logical, virtual, or physical databases, depending on system design. Web server 806, computer 804, laptop 802 may have similar or different architecture as described with respect to data server 810. Those of skill in the art will appreciate that the functionality of data server 810 (or web server 806, computer 804, laptop 802) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:
receiving, at a kiosk in direct communication with an analytical chemistry system over a local network and separate from the analytical chemistry system, data associated with the analytical chemistry system as the data is generated by the analytical chemistry system;
wherein the kiosk is capable of directly controlling settings or parameter values for the analytical chemistry system, wherein a user can select the system health issue on the kiosk to effect a real-time response from the analytical chemistry system;
identifying a trigger condition in the data;
receiving, at the kiosk, a notification of a system health issue for the analytical chemistry system;
looking up the issue in a system health condition database to retrieve an issue resolution structure, the issue resolution structure comprising explanatory text and an adjustment to be made to the analytical chemistry system; and
displaying the explanatory text in an interface on a display of the kiosk.

2. The computer-implemented method of claim 1, further comprising automatically uploading the data to a cloud computing service, wherein the notification is received from the cloud computing service.

3. The computer-implemented method of claim 1, wherein the kiosk is configured to be in direct communication with the analytical chemistry system and to execute an action from the issue resolution structure to make the adjustment.

4. The computer-implemented method of claim 3, wherein the action is executed in real time in response to a user instruction.

5. The computer-implemented method of claim 3, wherein the explanatory text comprises first explanatory text that describes a problem and a solution, the solution linked to the action from the issue resolution structure, and further comprising:

receiving a selection of the first explanatory text; and automatically performing the action from the issue resolution structure without further user interaction.

6. The computer-implemented method of claim 1, wherein identifying the trigger condition comprises:

comparing the data to a maintenance limit, or identifying a trend in the data.

7. The computer-implemented method of claim 1, wherein the system health issue is a diagnostic or maintenance issue.

8. A non-transitory computer-readable storage medium, the computer-readable storage medium including instructions that when executed by a computer, cause the computer to:

receive, at a kiosk in direct communication with an analytical chemistry system over a local network and separate from the analytical chemistry system, data associated with the analytical chemistry system as the data is generated by the analytical chemistry system;

wherein the kiosk is capable of directly controlling settings or parameter values for the analytical chemistry system, wherein a user can select the system health issue on the kiosk to effect a real-time response from the analytical chemistry system;

identify a trigger condition in the data;

receive, at the kiosk, a notification of a system health issue for the analytical chemistry system;

look up the issue in a system health condition database to retrieve an issue resolution structure, the issue resolution structure comprising explanatory text and an adjustment to be made to the analytical chemistry system; and display the explanatory text in an interface on a display of the kiosk.

9. The computer-readable storage medium of claim 8, wherein the instructions further configure the computer to automatically upload the data to a cloud computing service, wherein the notification is received from the cloud computing service.

10. The computer-readable storage medium of claim 8, wherein the kiosk is configured to be in direct communication with the analytical chemistry system and to execute an action from the issue resolution structure to make the adjustment.

11. The computer-readable storage medium of claim 10, wherein the action is executed in real time in response to a user instruction.

12. The computer-readable storage medium of claim 10, wherein the explanatory text comprises first explanatory text that describes a problem and a solution, the solution linked to the action from the issue resolution structure, and wherein the instructions further configure the computer to:

receive a selection of the first explanatory text; and automatically perform the action from the issue resolution structure without further user interaction.

13. The computer-readable storage medium of claim 8, wherein identifying the trigger condition comprises:

comparing the data to a maintenance limit, or identifying a trend in the data.

14. The computer-readable storage medium of claim 8, wherein the system health issue is a diagnostic or maintenance issue.

15. A computing apparatus comprising:

a processor; and a memory storing instructions that, when executed by the processor, configure the apparatus to:

receive, at a kiosk in direct communication with an analytical chemistry system over a local network and separate from the analytical chemistry system, data associated with the analytical chemistry system as the data is generated by the analytical chemistry system;

wherein the kiosk is capable of directly controlling settings or parameter values for the analytical chemistry system, wherein a user can select the system health issue on the kiosk to effect a real-time response from the analytical chemistry system;

identify a trigger condition in the data;

receive, at the kiosk, a notification of a system health issue for the analytical chemistry system;

look up the issue in a system health condition database to retrieve an issue resolution structure, the issue resolution structure comprising explanatory text and an adjustment to be made to the analytical chemistry system; and display the explanatory text in an interface on a display of the kiosk.

16. The computing apparatus of claim 15, wherein the instructions further configure the apparatus to automatically upload the data to a cloud computing service, wherein the notification is received from the cloud computing service.

17. The computing apparatus of claim 15, wherein the kiosk is configured to be in direct communication with the analytical chemistry system and to execute an action from the issue resolution structure to make the adjustment.

18. The computing apparatus of claim 17, wherein the action is executed in real time in response to a user instruction.

19. The computing apparatus of claim 17, wherein the explanatory text comprises first explanatory text that describes a problem and a solution, the solution linked to the action from the issue resolution structure, and wherein the instructions further configure the apparatus to:

receive a selection of the first explanatory text; and automatically perform the action from the issue resolution structure without further user interaction.

20. The computing apparatus of claim 15, wherein identifying the trigger condition comprises:

comparing the data to a maintenance limit, or identifying a trend in the data.

* * * * *